May 15, 1923.  1,455,034
J. W. SMALL
ELECTRICAL DRYING APPARATUS
Filed July 3, 1922

Patented May 15, 1923.

1,455,034

UNITED STATES PATENT OFFICE.

JAMES W. SMALL, OF CHICAGO, ILLINOIS.

ELECTRICAL DRYING APPARATUS.

Application filed July 3, 1922. Serial No. 572,690.

*To all whom it may concern:*

Be it known that I, JAMES W. SMALL, a citizen of the United States, residing at Chicago, in the county of Cook and State of Illinois, have invented certain new and useful Improvements in Electrical Drying Apparatus, of which the following is a specification.

My invention relates to drying apparatus and particularly to electrical devices of this character adapted for drying the hands and face.

One object of my improvement is the provision of a simple and efficient device of the character mentioned.

A further object is the provision of a simple and efficient drying device in which cold air is passed along the heated air in order to preliminarily heat such air before reaching the heating element proper.

A further object is the provision of a simple device of this character having an enclosing casing with the operating parts of the device mounted on the door of the casing so as to swing entirely out of such casing when the door is opened.

A still further object is the provision of a passage for heated air having a heating element in one end thereof and means for guiding the cold air along the heated air passage so as to absorb heat therefrom before such air reaches the heating element proper.

Other objects will appear hereinafter.

An embodiment of my invention is illustrated in the accompanying drawing forming a part of this specification and in which—

Fig. 1 is a central section taken vertically through a device embodying my invention; and Fig. 2 is a transverse section taken on line 2—2 of Fig. 1.

Referring more particularly to the drawing, I provide a casing which may be of any preferred shape and size, but preferably tubular. Said casing 3 may have an enlarged portion 4 at its bottom to facilitate holding it in upright condition. In one side of the casing 3 is a door opening 5 in which is mounted a door 6 on hinges 7. The door 6 is preferably of a size so that the operating parts of the device can be mounted thereon and permit such operating devices to swing out of the casing upon opening the door. This permits easy access to the operating parts of the device.

The casing 3 is open at its top and has extensions 8 extending upwardly therefrom with said extensions attached to a top 9. In the present instance, the top 9 is indicated as of substantially flat shape with a depending flange 10 extending down over the space between the casing 3 and the flat bottom 9. At the center of the part 9 is one or more openings 11 through which heated air is expelled from the casing 3. A partition 12, which in the present instance is indicated as being funnel-shaped, depends from the part 9 and surrounds the openings 11 so as to guide the air to said openings 11.

On the door 6 is mounted a tubular member 13 which has its top open and of substantially the same size and shape as the bottom of funnel 12. The adjacent edges of tube 13 and funnel 12 are so arranged that the door can easily open and move the tube 13 out of the casing without disturbing the funnel 12 and so that a substantially tight joint will be formed between the parts 12 and 13 when the door is closed.

Within the tube 13 is mounted a heating element 14. In the present instance, two of said heating elements are indicated, one above the other, and it will be understood that as many heating elements may be provided as desired. These heating elements are preferably electrical units and may be formed in any desirable manner, such as now in general use. The elements 14, however, are preferably arranged so as to engage as much air as possible while such air is passing through the tube 13.

Below the heating elements 14 in the tube 13 is a member for facilitating the movement of air through the tube 13. In the present instance, this is indicated as being a fan 15 mounted on an electric motor 16, and the latter is mounted on the door 6 so as to move out of the casing when the door is opened. The fan 15 is arranged somewhat near the lower end of the tube 13, and preferably just within the lower end of it, so as to ensure driving the air toward the heating element and drawing such air down around on the outside of tube 13 and through the openings between the extensions 8 at the top of casing 3.

The electric motor may be operated by any suitable electrical current supply and controlled in any desirable manner. I find that it is advantageous to arrange the electrical circuit of the motor so that the latter can be operated at a desired speed to heat the air issuing from openings 11 to desired temperatures. This may be accomplished by introducing resistance into the motor circuit, and in the present instance I have indicated a rheostat 17 mounted on the door 6 and connected in the motor circuit. The rheostat has a handle 18 which can be adjusted in the usual manner to vary the resistance placed in the motor circuit.

I also preferably provide a distributing block for connecting the heating and motor circuits so that should injury happen to any one of the circuits it will not interfere with the operation of the others. In the present instance, a block 19 of insulating material is mounted on the door 6 within the casing 3 and bus-bars 20 mounted on the block with a circuit 21 leading to one of the heating elements 14 and a circuit 22 leading to the other heating element. The motor circuit is indicated by the reference numeral 23. It will be seen that with this arrangement each of the heating elements and the motor circuit are so arranged that one can operate without the other.

The bus-bars 20 are connected by wires 24 to a cut-out switch at the bottom of the casing 3. This switch may be of any preferred construction. The construction shown has four contact members 25 and 26. These contact members are mounted in suitable insulating material 27 on a frame 28 in the casing. Below the contact members 25 and 26 is a vessel 29 containing an insulating material, such as oil, and in the bottom of the vessel 29 are electrical contact plates 30 mounted on insulation material 31. The arrangement is such that when the vessel 29 is moved upwardly the members 26 will engage one of the plates 30 and members 25 will engage the other plate 30 so as to connect the line wires 32 with the bus-bars 20. The members 25 and 26 may have a piece of insulation material 33 secured thereto in the vessel 29 so as to facilitate holding the oil in said vessel and guiding the latter during movements of said vessel to open and close the circuit. The vessel 29 is preferably mounted on the end of a lever 34 which may be pivoted as at 35 to the frame 28. With this arrangement, when it is desired to dry the hands and face, the person steps on lever 34 which closes the switch between wires 24 and 32, thus completing all of the electrical circuits in the device. The heating elements become hot and the fan motor drives the fan which sucks the air down around the funnel 12 and tube 13, and then forces it up through the heating elements out through funnel 12 and openings 11 to drive the hands or face held above said openings 11. When the hands are dry the operator simply takes his foot off of the lever 34 and the weight of the latter and vessel 29 automatically opens the switch, thereby breaking the electrical circuits and stopping the operation of the heaters and motor.

Important features of this invention are preliminarily heating the air before it reaches the heating elements proper and mounting the heating elements and fan on the door of the casing so that they can be moved to convenient position when desired upon opening the door.

I claim:—

1. Electrical drying apparatus comprising a casing having a plurality of openings in its top; an electrical heating element in the casing; and a partition in the casing separating said openings and adapted to direct air from certain of the openings to the heating element and from the latter to the other openings.

2. Electrical drying apparatus comprising a casing having a plurality of openings in its top, certain of said openings being disposed around the others; a partition extending downwardly from the top of the casing between said openings, and an electrical heating element within the partition.

3. Electrical drying apparatus comprising a casing having two sets of openings in its top, one set of said openings being disposed around the other set; a partition extending downwardly from the top of the casing between said sets of openings; an electrical heating element within the partition; and means for exhilarating the passage of air from one set of openings over the heating element to the other set of openings.

4. Electrical drying apparatus comprising a casing having a plurality of openings in its top, certain of the openings being disposed around the other openings; a tubular partition extending downwardly from the top of the casing and encircling the central openings; a heating element in the tubular partition; and a fan within the partition below the heating element.

5. Electrical drying apparatus comprising a tubular casing; a tubular partition disposed within and spaced from the inner walls of said casing, there being a discharge opening at the top of the casing opening into the interior of the partition and an intake opening at the top of the casing opening into the latter between the walls of such casing and said partition; and a heating element within the tubular partition.

6. Electrical drying apparatus comprising a casing having a door opening in one side; a door in said opening; and air heating means mounted on said door adapted to swing entirely out of the casing when the door is opened.

7. Electrical drying apparatus comprising a casing having a door opening in one side and intake and discharge openings at its top; a door in said door opening; a tubular partition extending downwardly from the top of the casing and separating said intake and discharge openings, part of said tubular partition being attached to the casing and another part of said partition being attached to the door; and a heating element mounted in the last-mentioned part of said tubular partition.

8. Electrical drying apparatus comprising a casing having a door opening in one side and intake and discharge openings at its top; a door in said door opening; a tubular partition extending downwardly from the top of the casing and separating said intake and discharge openings, part of said tubular partition being attached to the casing and another part of said partition being attached to the door; a heating element mounted in the last-mentioned part of said tubular partition; and a fan mounted on said door and disposed at the intake end of the passage in said tubular partition.

9. Electrical drying apparatus comprising a tubular casing having spaced intake and discharge openings at its top and a door opening in its side; a door in said door opening; a tubular partition extending downwardly from the top of the casing and separating said intake and discharge openings, a portion of said tubular partition being attached to the casing and another portion attached to the door, said portions of said tubular partition being adapted to move relatively from each other; and a heating element mounted in the part of said tubular partition attached to the door and movable with the latter.

10. Electrical drying apparatus comprising walls enclosing a central air passage; a heating element adapted to heat air in said air passage; and a wall surrounding the first-mentioned walls adapted to conduct cold air along the first-mentioned walls to said heating element.

11. Electrical drying apparatus comprising a casing with intake and discharge openings therein; a heating element in the casing; means in the casing for directing air from the intake opening to the discharge opening; a motor in the casing; a fan attached to the motor; and an electrical circuit including a variable resistance for regulating the speed of said motor.

12. Electrical drying apparatus comprising a casing; an electrical heating apparatus in the casing; an electrically driven fan in said casing; electrical circuits including said heating elements and motor of the motor driven fan; electrical supply wires connected with said electrical circuits; fixed contact members connected with said supply wires; movable contacts; an oil-holding vessel carrying said movable contacts; a lever mounted in the casing and attached to said vessel for moving the latter to carry said movable contacts into engagement with the fixed contacts.

13. Electrical drying apparatus comprising a casing having a door opening and a discharging opening therein; a door closing said door opening; and air-heating means mounted in the casing adjacent the door opening and connected with the air-discharging opening.

14. Electrical drying apparatus comprising a casing having air intake and discharging openings; heating means in the casing; means controlling the passage of air from said air intake opening to the heating means and from the latter to said air-discharging opening; and a door on the casing rendering the parts within the casing easily accessible.

In testimony whereof I have signed my name to this specification on this 17th day of June, A. D. 1922.

JAMES W. SMALL.